United States Patent
Huh et al.

(10) Patent No.: US 9,610,953 B2
(45) Date of Patent: Apr. 4, 2017

(54) SYSTEM AND METHOD FOR CONTROLLING REGENERATIVE BRAKING

(71) Applicants: Hyundai Motor Company, Seoul (KR); Kia Motors Corporation, Seoul (KR)

(72) Inventors: Jee Wook Huh, Gyeonggi-Do (KR); Gwang Il Du, Incheon (KR); Sang Joon Kim, Seoul (KR); Teh Hwan Cho, Gyeonggi-Do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 14/627,221

(22) Filed: Feb. 20, 2015

(65) Prior Publication Data

US 2016/0121901 A1    May 5, 2016

(30) Foreign Application Priority Data

Oct. 29, 2014    (KR) ........................ 10-2014-0148254

(51) Int. Cl.
*B60L 9/00* (2006.01)
*B60W 10/02* (2006.01)
(Continued)

(52) U.S. Cl.
CPC ......... *B60W 30/18127* (2013.01); *B60K 6/20* (2013.01); *B60L 7/18* (2013.01); *B60L 11/1859* (2013.01); *B60L 11/1861* (2013.01); *B60L 15/2009* (2013.01); *B60W 10/26* (2013.01); *B60W 20/00* (2013.01); *B60L 2210/40* (2013.01); *B60L 2240/423* (2013.01); *B60L 2240/545* (2013.01); *B60L 2240/547* (2013.01); *B60L 2240/549* (2013.01); *Y02T 10/645* (2013.01); *Y02T 10/705* (2013.01); *Y02T 10/7005* (2013.01); *Y02T 10/7044* (2013.01);
(Continued)

(58) Field of Classification Search
USPC ................................ 701/22; 477/5; 303/152
See application file for complete search history.

(56) References Cited

U.S. PATENT DOCUMENTS 6,126,251 A * 10/2000 Yoshii ....................... B60L 7/26
                                                        303/152
6,213,571 B1 * 4/2001 Yamada .................. B60L 7/006
                                                        188/158
(Continued)

FOREIGN PATENT DOCUMENTS

JP          10-136511          5/1998
JP          11-018207          1/1999
(Continued)

*Primary Examiner* — Tyler Paige
(74) *Attorney, Agent, or Firm* — Mintz Levin Cohn Ferris Glovsky and Popeo, P.C.; Peter F. Corless (57) ABSTRACT

A system and method for controlling a regenerative braking are provided. The system includes a driving information detector that is configured to detect whether a brake pedal is operated and detect shift information. In addition, a hybrid control unit is configured to fix the regenerative braking during actual shifting based on the shift information and is configured to use a required braking force when the actual shifting is not performed to calculate the regenerative braking.

15 Claims, 5 Drawing Sheets

(51) Int. Cl.
*B60T 8/64* (2006.01)
*B60W 30/18* (2012.01)
*B60W 20/00* (2016.01)
*B60K 6/20* (2007.10)
*B60W 10/26* (2006.01)
*B60L 7/18* (2006.01)
*B60L 11/18* (2006.01)
*B60L 15/20* (2006.01)

(52) U.S. Cl.
CPC ........ *Y02T 10/7241* (2013.01); *Y02T 10/7275* (2013.01); *Y10S 903/947* (2013.01)

(56) References Cited

U.S. PATENT DOCUMENTS

| | | | | |
|---|---|---|---|---|
| 7,329,204 | B2* | 2/2008 | Senda | B60W 10/02 180/65.265 |
| 9,067,577 | B2* | 6/2015 | Ito | B60L 3/0092 |
| 2003/0080614 | A1* | 5/2003 | Soga | B60K 6/44 303/152 |
| 2007/0102208 | A1* | 5/2007 | Okuda | B60K 6/48 180/65.31 |
| 2009/0312142 | A1* | 12/2009 | Minamikawa | B60W 30/18136 477/5 |
| 2011/0118920 | A1 | 5/2011 | Kim | |
| 2012/0265382 | A1* | 10/2012 | Nefcy | B60W 10/06 701/22 |
| 2013/0218435 | A1* | 8/2013 | Nakamura | B60L 7/14 701/70 |
| 2014/0148985 | A1* | 5/2014 | Sato | B60W 20/00 701/22 |

FOREIGN PATENT DOCUMENTS

| | | |
|---|---|---|
| JP | 2000-170903 A | 6/2000 |
| JP | 2007-246018 A | 9/2007 |
| JP | 2010-083454 A | 4/2010 |
| JP | 2013-100095 A | 5/2013 |
| KR | 2011-0044565 A | 4/2011 |
| KR | 10-2011-0054470 A | 5/2011 |
| KR | 10-2012-0128209 A | 11/2012 |

\* cited by examiner

SYSTEM AND METHOD FOR CONTROLLING REGENERATIVE BRAKING

CROSS-REFERENCE TO RELATED APPLICATION

This application is based on and claims the benefit of priority to Korean Patent Application No. 10-2014-0148254, filed on Oct. 29, 2014 in the Korean Intellectual Property Office, the disclosure of which is incorporated herein in its entirety by reference.

TECHNICAL FIELD

The present disclosure relates to a system and method for controlling a regenerative braking, and more particularly, to a technology of controlling a regenerative braking during shifting.

BACKGROUND

An electric vehicle is a type of vehicle that includes a motor driven by electric energy stored in a battery and uses the entire or a portion of driving force of the motor as a power source. Today, the electric vehicle is classified into a pure electric vehicle (EV) which uses electric energy of the battery as the power source and a hybrid electric vehicle (HEV) which includes an internal combustion engine to charge the battery and/or drive the vehicle using power generated from the engine.

Generally, the electric vehicle uses a portion of braking force during braking of the vehicle to generate electricity and charges the generated electric energy in the battery. Accordingly, the electric vehicle uses a portion of kinetic energy by a driving speed of the vehicle as energy required to drive a generator to simultaneously implement a reduction in the kinetic energy (that is, reduction in the driving speed) and a generation of the electric energy. The braking method described above is referred to as a regenerative braking.

The electric energy may be generated during the regenerative braking by reversely driving a separate generator or the motor. By performing the control of the regenerative braking during the braking of the electric vehicle, it may be possible to improve a driving distance of the electric vehicle (e.g., increase the driving distance) and improve fuel efficiency of the hybrid electric vehicle and reduce an emission of harmful exhaust gas.

Figure 1:
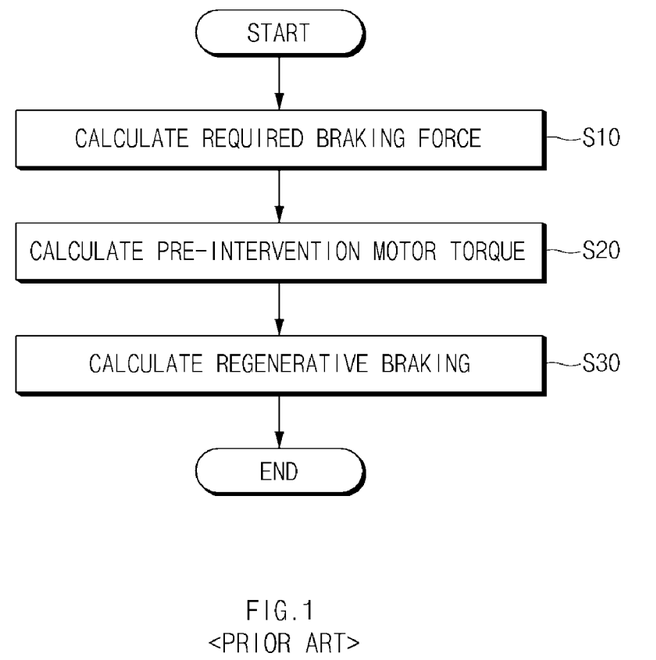
FIG. 1 is an exemplary flow chart illustrating a general method for controlling a regenerative braking according to the related art.

Referring to FIG. 1, the related art calculates a required braking force to calculate the regenerative braking (S10), calculates a pre-intervention motor torque using the required braking force (S20), and then calculates the regenerative braking using the pre-intervention motor torque (S30).

In a general condition in which there is no need to perform the shifting, an input torque of a transmission is controlled by adjusting the post-intervention motor torque and an output shaft torque of the transmission is determined by a profile of the pre-intervention motor torque by slips of a clutch and a brake element in the transmission. In many instances of the shifting, a torque of the output shaft of the transmission may be more accurately estimated by performing the control as described above and therefore drivability and fuel efficiency for a regenerative braking system may be substantially improved. However, the torque may be increased due to the slips of the clutch and the brake element in the transmission during shifting. Accordingly, the torque of the input shaft is reduced by the torque intervention to correspond to the torque of the output shaft of the transmission. Today, the shifting is performed by referring to the pre-intervention torque before the entry of the shifting during braking of the vehicle. Therefore, even when a braking intention of a driver is changed, the driver's intention is not reflected to the shifting (e.g., the shifting is not actually performed).

Figure 2:
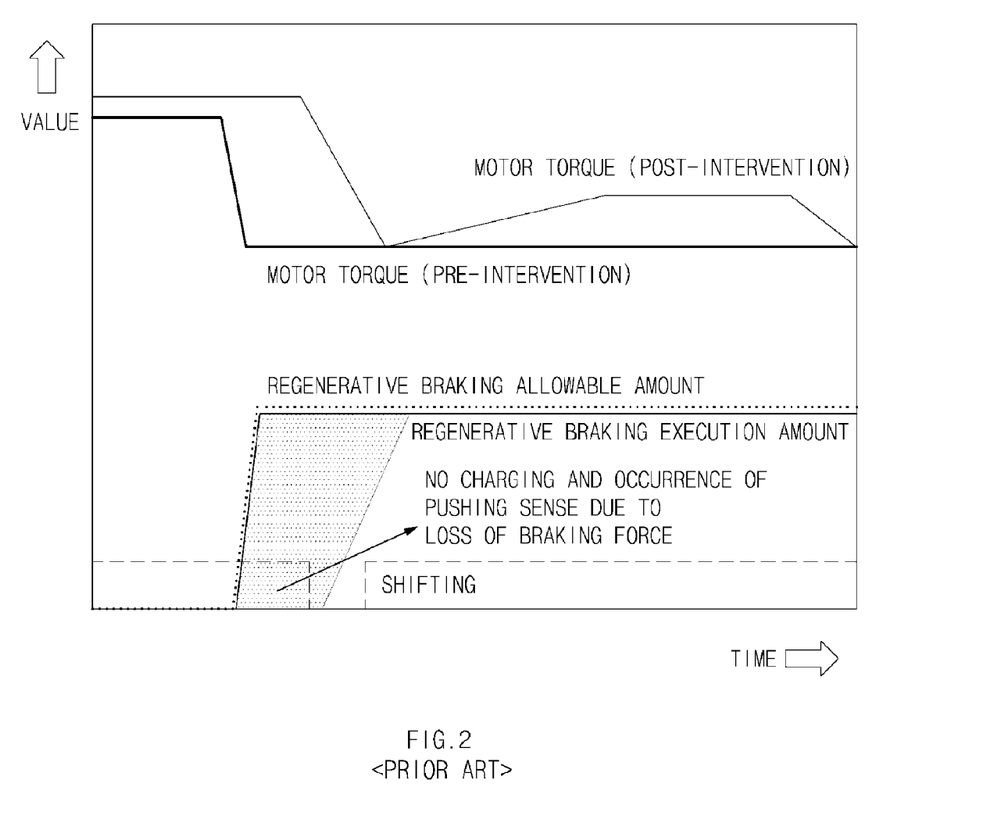
FIG. 2 is an exemplary graph illustrating an experiment value depending on a general control of a regenerative braking according to the related art.

Referring to FIG. 2, even when the braking force is increased during the shifting, the regenerative braking is calculated using the pre-intervention motor torque and therefore the regenerative braking may be calculated incorrectly. In other words, when the braking starts during the shifting, a hybrid control unit (HCU) is configured to generate the pre-intervention motor torque since the driver's required braking is increased. However, since a transmission control unit (TCU) refers to the motor torque before the shifting, the braking force is lost and thus a pushing sense is generated. Accordingly, the related art calculates the regenerative braking using the pre-intervention motor torque even during the shifting to incorrectly determine an area in which the charging is not performed as the case in which the regenerative braking is performed.

SUMMARY

The present disclosure has been made to solve the above-mentioned problems occurring in the prior art while advantages achieved by the prior art are maintained intact. An aspect of the present disclosure provides a system and method for controlling a regenerative braking that may determine whether braking is entered during the actual shifting to assume a driver's required regenerative braking torque as a torque before actual shifting and preventing pre-intervention motor torque from increasing to prevent the regenerative braking from being calculated incorrectly.

According to an exemplary embodiment of the present disclosure, a system for controlling a regenerative braking may include: a driving information detector configured to detect whether a brake pedal is operated and detect shift information; and a hybrid control unit (e.g., hybrid controller) configured to maintain the regenerative braking during shifting based on the shift information and use a required braking force when the shifting is not performed to calculate the regenerative braking.

The hybrid control unit may be configured to determine whether the required braking force is increased based on whether the brake pedal is operated during shifting. The hybrid control unit may also be configured to maintain the regenerative braking when the required braking force is increased during shifting and calculate the regenerative braking when the required braking force is not increased (e.g., remains substantially constant or decreases). The hybrid control unit may be configured to increase an absolute amount of a pre-intervention motor torque as much as the required braking force after the shifting ends to calculate the regenerative braking.

According to another exemplary embodiment of the present disclosure, a method for controlling a regenerative braking may include: calculating a required braking force; determining whether shifting is performed; calculating the regenerative braking using a pre-intervention motor torque when the shifting is not preformed; determining whether the required braking force is increased during the shifting; and maintaining the regenerative braking to a previous regenerative braking when the required braking force is increased during the shifting.

The method may further include: calculating the regenerative braking using the pre-intervention motor torque when the required braking force is not increased during the shifting. In addition, the method may include: calculating the pre-intervention motor torque using the increased required braking force and calculating the regenerative braking using the pre-intervention motor torque, when the shifting ends. The increased required braking force may be applied as a 3-stage slope when the shifting ends.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, exemplary embodiments of the present disclosure will be described in detail with reference to the accompanying drawings so that those skilled in the art may easily implement the spirit of the present disclosure.

An exemplary embodiment of the present disclosure discloses a technology of calculating a regenerative braking using a pre-intervention motor torque in a general state in which shifting is not performed, maintaining the regenerative braking to a previous regenerative braking during shifting, increasing an absolute amount of the pre-intervention motor torque as much as a driver's required braking force when the shifting ends to calculate the regenerative braking to implement a rapid entry of the regenerative braking, thereby maintaining a braking sense and minimizing a difference in braking sense.

Figure 4:
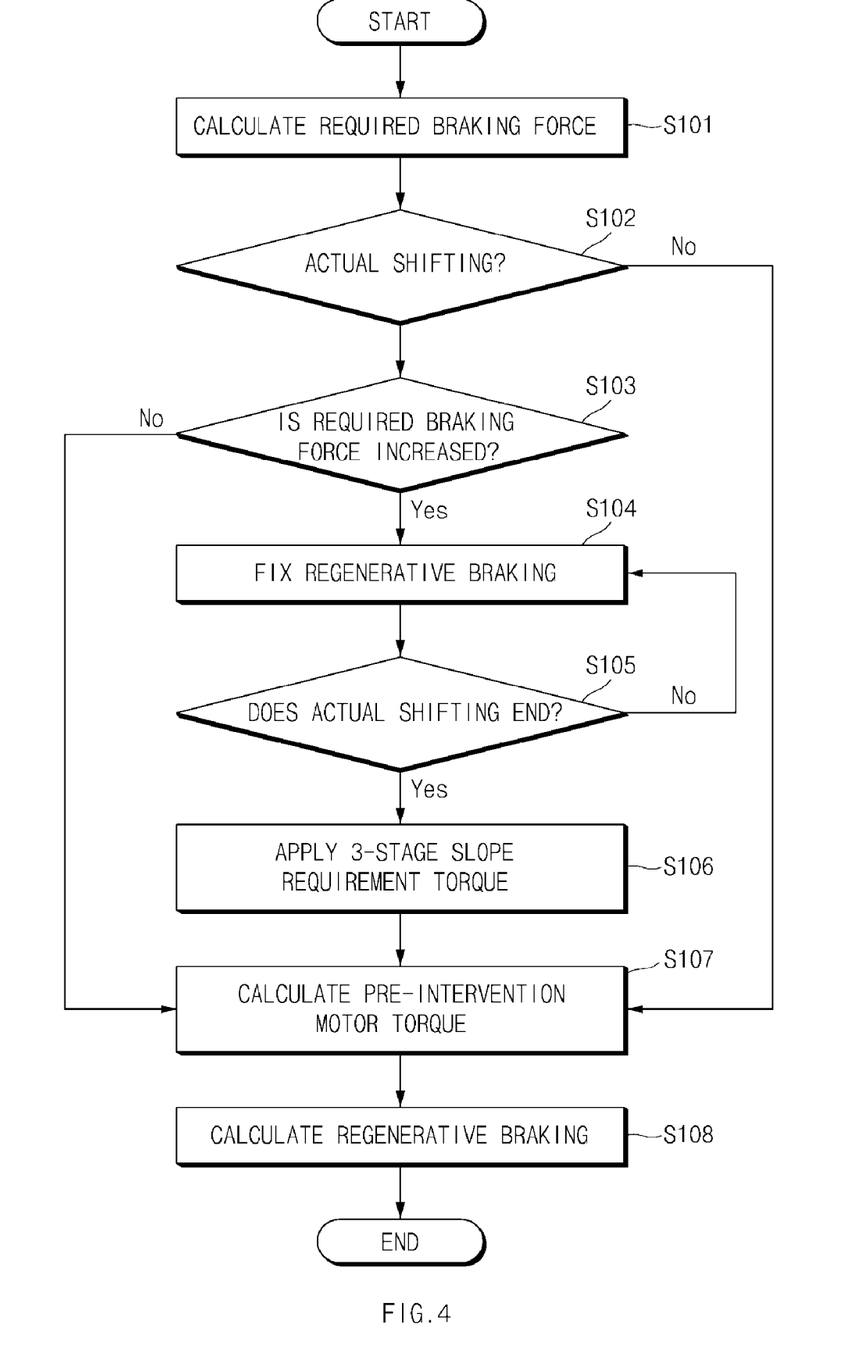
FIG. 4 is an exemplary flow chart illustrating a method for controlling a regenerative braking according to the exemplary embodiment of the present disclosure.
Figure 5:
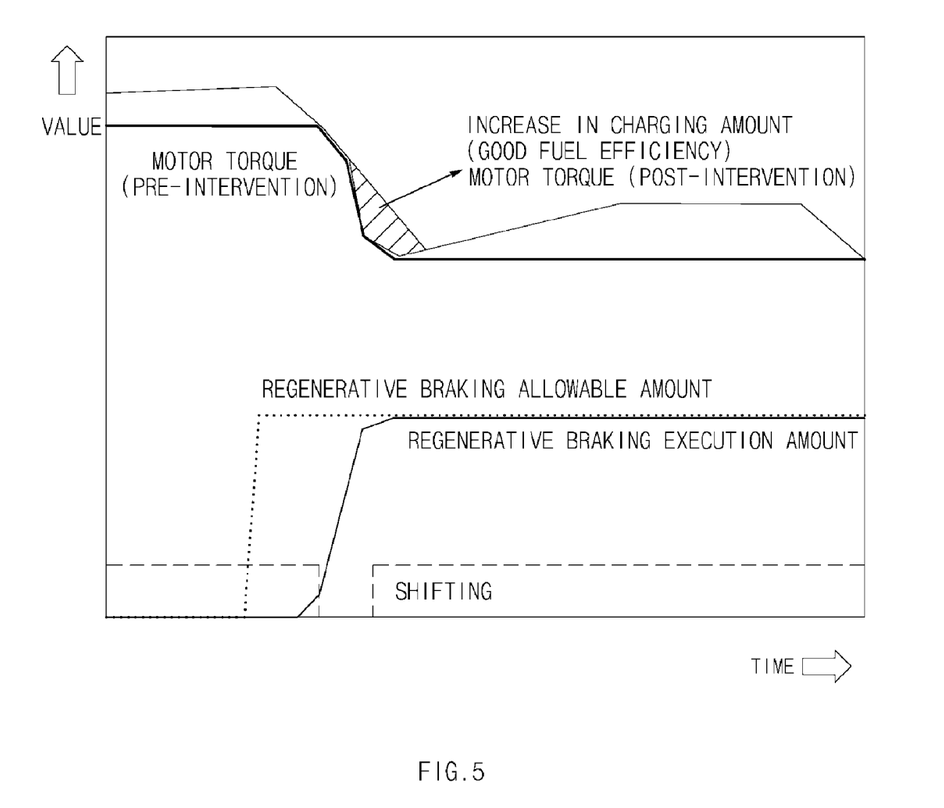
FIG. 5 is an exemplary graph illustrating an experiment value depending on the regenerative control according to the exemplary embodiment of the present disclosure.

Hereinafter, exemplary embodiments of the present disclosure will be described in detail with reference to FIGS. 3 to 5.

Figure 3:
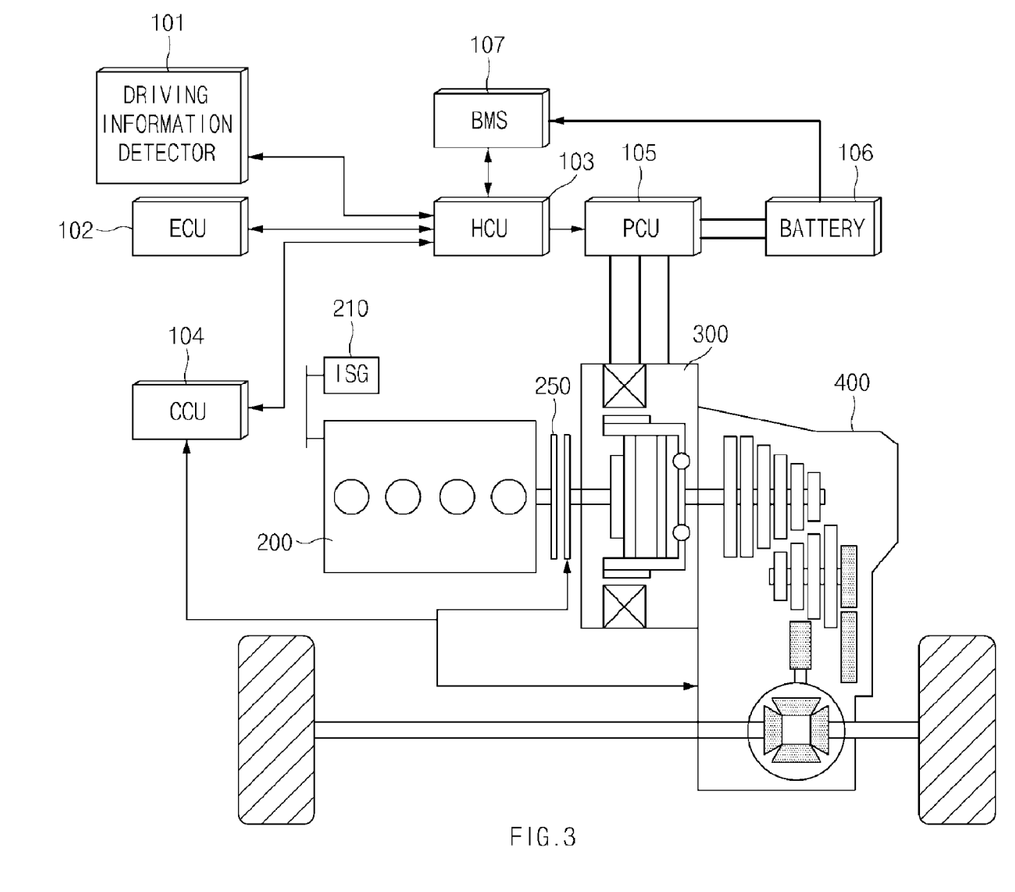
FIG. 3 is an exemplary configuration diagram of a system for controlling a regenerative braking according to an exemplary embodiment of the present disclosure.

FIG. 3 is an exemplary diagram illustrating a system for controlling a regenerative braking of a hybrid vehicle according to an exemplary embodiment of the present disclosure. Referring to FIG. 3, according to the exemplary embodiment of the present disclosure, the system for controlling a regenerative braking may include a driving information detector 101, an engine control unit (ECU) 102, a hybrid control unit (HCU) 103, a clutch control unit (CCU) 104, a power control unit (PCU) 105, a battery 106, a battery management system (BMS) 107, an engine 200, an engine clutch 250, a motor 300, and a transmission 400.

The driving information detector 101 may include a brake pedal sensor configured to detect whether a brake pedal is operated (e.g., engaged) and an accelerator pedal sensor (APS) configured to detect an operating displacement of an accelerator pedal (e.g., a degree of engagement) and provide a detection signal regarding whether the brake pedal is operated to the HCU 103 (hereinafter, referred to as a hybrid control unit). Further, the driving information detector 101 may be configured to detect shifting information from a transmission (not illustrated) and provide the detected shifting information to the hybrid control unit 103. The ECU 102 may be linked with the HCU 103 which is connected by a network to operate the engine 200 and provide operation state information of the engine 200 to the HCU 103.

The hybrid control unit 103 may be a highest controller and may be configured to integrally operate lower controllers connected by the network and collect and analyze the information of each lower controller to operate the hybrid vehicle. Further, the HCU 103 may be configured to calculate a required braking force based on the detection signal of the driving information detector 101 regarding whether the brake pedal is operated, determine whether shifting is performed to maintain the regenerative braking when shifting is performed and apply the calculated required braking force when the shifting is not performed, and calculate the regenerative braking using a pre-intervention motor torque.

In other words, even though an absolute amount of the pre-intervention motor torque is increased during braking and shifting, the HCU 103 refers to the motor torque before the shifting without reflecting the increased absolute amount to perform torque intervention. Therefore, a loss of the braking sense may be prevented by maintaining the motor torque before the shifting when the braking force is increased during the shifting and. In addition, a driver may not feel a difference in the braking sense by tracking a required braking force during a reduction in braking force. Meanwhile, the HCU 103 may be configured to increase the absolute amount of the pre-intervention motor torque as much as the driver's required braking force after the shifting ends to implement a rapid entry of regenerative braking compared to the related art, thereby increasing fuel efficiency and improving a braking sense of difference. Further, the HCU 103 may be configured to apply a 3-stage slope in consideration of trackability of a brake oil pressure, thereby securing a more rapid regenerative braking force and improving drivability.

The CCU 104 may be configured to maintain gear engagement of the transmission 400 based on a control of the HCU 103 even when shutting off of a power supply is detected when the control of the regenerative braking is performed. The PCU 105 may include an inverter which is configured of a motor control unit (MCU) and a plurality of power switching devices and a protective circuit and may be configured to convert a direct-current (DC) voltage supplied from the battery 106 into a 3-phase alternating current (AC) voltage based on a control signal applied from the HCU 103 to execute a driving of the motor 300.

To assist an output of the engine 200 in an HEV mode, the battery 106 may be configured to supply power to the motor 300 and may be charged with a voltage generated from the motor 300 based on the control of the regenerative braking. Further, power may be supplied to the motor 300 in an EV mode and a voltage generated from the motor 300 which is operated by the generator during the control of the regenerative braking may be charged.

The BMS 107 may be configured to integrally detect information regarding voltage, current, temperature, and the like of the battery 106 to manage and adjust a charging state and adjust a charging and discharging current amount of the battery 106 to prevent the battery from being overdischarged to a threshold voltage or less or from being overcharged to a threshold voltage or greater. The BMS 107 may be configured to operate a main relay to adjust the output of the battery 106 based on a control signal required in the HCU 103, to be turned on or off. The engine 200 may be operated to be driven at an optimum operating point based on the control of the ECU 102.

A hybrid-starter generator (HSG) 210 may be configured idle stopping and re-starting of the engine 200 based on a driving condition of the vehicle. The engine clutch 250 may be disposed between the engine 200 and the motor 300 and may be operated based on the control of the CCU 104 to adjust a power transfer between the engine 200 and the motor 300. The motor 300 may be driven by the 3-phase AC voltage supplied via the PCU 105 to assist the output torque of the engine 200 and may be operated by the generator when an extra (e.g., an additional) torque is present in the output of the engine 200 or during braking.

The transmission 400 may be configured to adjust a shift ratio based on the control of the CCU 104 and distribute the output torques, which are summed and applied by the clutch 250 based on a driving mode, depending on the shift ratio and transfer the output torques to a driving wheel to drive the vehicle. The transmission 400 may be applied as an automatic transmission or a continuously variable transmission. In the hybrid vehicle according to the exemplary embodiment of the present disclosure having the foregoing functions, a general operation is performed to be the same or similar to the existing hybrid vehicle and therefore a detailed description thereof will be omitted.

Hereinafter, a method for controlling a regenerative braking according to an exemplary embodiment of the present disclosure will be described below with reference to FIG. 4. First, the HCU 103 may be configured to use a brake pedal operating signal output from the driving information detector 101 to calculate the user's required braking force (e.g., a braking force intention amount) (S101). The HCU 103 may then be configured to use shift information output from the driving information detector 101 to determine whether a vehicle is currently in an actual shift mode (S102).

When the vehicle is not in an actual shift mode, the HCU 103 may be configured to use the calculated required braking force to calculate a pre-intervention motor torque (S107) and use the calculated motor torque to calculate the regenerative braking (S108). Meanwhile, when the vehicle is in an actual shift mode, the HCU 103 may be configured to use the brake pedal operating signal output from the driving information detector 101 to determine whether the required braking force is increased after the actual shifting (S103).

Based on the determination result of S103, when the required braking force is not increased, the HCU 103 may be configured to use the calculated required braking force to calculate the pre-intervention motor torque (S107) and use the calculated motor torque to calculate the regenerative braking (S108). Further, based on the determination result of S103, when the required braking force is increased, the HCU 103 may be configured to maintain the regenerative braking to a previously calculated regenerative braking (S104) and determine whether the actual shifting ends (S105). Based on the determination result of the process S105, the HCU 103 may be configured to repeatedly perform the above process S105 when the actual shifting does not end and when the actual shifting ends, the HCU 103 may be configured to calculate the required braking force (e.g., required torque) increased in the above process S103 and apply the calculated required braking force as the 3-stage slope (S106), use the increased required braking force to calculate the pre-intervention motor torque (S107), and use the calculated motor torque to calculate the regenerative braking (S108).

As described above, the exemplary embodiment of the present disclosure has the following two features. Features of the present disclosure will be described with reference to FIG. 5 which is an exemplary graph illustrating experiment values based on the regenerative braking according to the exemplary embodiment of the present disclosure.

A first feature is a method for calculating a regenerative braking at the time of the braking during shifting. As described above, even though the absolute amount of the pre-intervention motor torque may be increased during braking while shifting, the transmission (not illustrated) may be configured to perform the torque intervention by referring to the motor torque before the shifting without reflecting the increased absolute amount. Therefore, the regenerative braking requirement torque during an increase of the braking force while shifting may maintain the existing torque during the shifting to prevent the loss of the braking sense and a difference in the braking sense by tracking the required braking force during a decrease in braking force.

A second feature is to implement the rapid entry of the regenerative braking compared to the related art by increasing the absolute amount of the pre-intervention motor torque as much as the driver's required braking force after the actual shifting ends, thereby increasing the fuel efficiency and improving the difference in braking sense. Further, in this case, it may be possible to secure the more rapid regenerative braking force and improve the drivability by applying the 3-stage slope in consideration of the trackability of the brake oil pressure.

According to the exemplary embodiments of the present disclosure, it may be possible to prevent the incorrect calculation of the regenerative braking during the shifting to prevent the drivability and the fuel efficiency from being aggravated due to the incorrect calculation of the regenerative braking.

The exemplary embodiments of the present disclosure described above have been provided for illustrative purposes. Therefore, those skilled in the art will appreciate that various modifications, alterations, substitutions, and additions are possible without departing from the scope and spirit of the present disclosure as disclosed in the accompanying claims and such modifications, alterations, substitutions, and additions fall within the scope of the present disclosure.

What is claimed is:

1. A system for controlling a regenerative braking, comprising:
    a driving information detector configured to detect whether a brake pedal is operated and detect shift information; and
    a hybrid control unit configured to determine whether a required braking force is increased during actual shifting, maintain the regenerative braking during actual shifting based on the shift information when the required braking force is increased during the actual shifting and use a required braking force to calculate the regenerative braking when the actual shifting is not performed or when the required braking force is not increased during the actual shifting.

2. The system according to claim 1, wherein the hybrid control unit is configured to determine whether the required braking force is increased based on whether the brake pedal is operated during the actual shifting.

3. The system according to claim 2, wherein the hybrid control unit is configured to maintain the regenerative braking when the required braking force is increased during the actual shifting and calculate the regenerative braking when the required braking force is remains substantially constant or decreases.

4. The system according to claim 3, wherein the hybrid control unit is configured to increase an absolute amount of a pre-intervention motor torque as much as the required braking force after the actual shifting ends to calculate the regenerative braking.

5. The system according to claim 1, wherein the driving information detector includes an acceleration pedal sensor and a brake pedal sensor.

6. A method for controlling a regenerative braking, comprising:
    calculating, by a controller, a required braking force;
    determining, by the controller, whether actual shifting is performed using a driving information detector;
    calculating, by the controller, the regenerative braking using a pre-intervention motor torque when the actual shifting is not preformed;
    determining, by the controller, whether the required braking force is increased during the actual shifting; and
    maintaining, by the controller, the regenerative braking to a previously calculated regenerative braking when the required braking force is increased during the actual shifting,
    wherein the controller calculates the regenerative braking using a pre-intervention motor torque when the required braking force is not increased during the actual shifting.

7. The method according to claim 6, further comprising:
    calculating, by the controller, the regenerative braking using the pre-intervention motor torque when the required braking force is not increased during the actual shifting.

8. The method according to claim 7, further comprising:
    calculating, by the controller, the pre-intervention motor torque using the increased required braking force and calculating the regenerative braking using the pre-intervention motor torque, when the actual shifting ends.

9. The method according to claim 8, wherein the increased required braking force is applied as a 3-stage slope when the actual shifting ends.

10. The method according to claim 1, wherein the driving information detector includes an acceleration pedal sensor and a brake pedal sensor.

11. A non-transitory computer readable medium containing program instructions executed by a controller, the computer readable medium comprising:
    program instructions that control a driving information detector to detect whether a brake pedal is operated and detect shift information; and
    program instructions that determine whether a required braking force is increased during actual shifting, maintain the regenerative braking during actual shifting based on the shift information when the required braking force is increased during the actual shifting and use a required braking force to calculate the regenerative braking when the actual shifting is not performed or when the required braking force is not increased during the actual shifting.

12. The non-transitory computer readable medium of claim 11, further comprising:
    program instructions that determine whether the required braking force is increased based on whether the brake pedal is operated during the actual shifting.

13. The non-transitory computer readable medium of claim 12, further comprising:
    program instructions that maintain the regenerative braking when the required braking force is increased during the actual shifting and calculate the regenerative braking when the required braking force is not increased.

14. The non-transitory computer readable medium of claim 13, further comprising:
    program instructions that increase an absolute amount of a pre-intervention motor torque as much as the required braking force after the actual shifting ends to calculate the regenerative braking.

15. The non-transitory computer readable medium of claim 11, wherein the driving information detector includes an acceleration pedal sensor and a brake pedal sensor.

* * * * *